T. J. CRAWFORD.
AIR BRAKE ATTACHMENT.
APPLICATION FILED JULY 17, 1908.
908,648.
Patented Jan. 5, 1909.
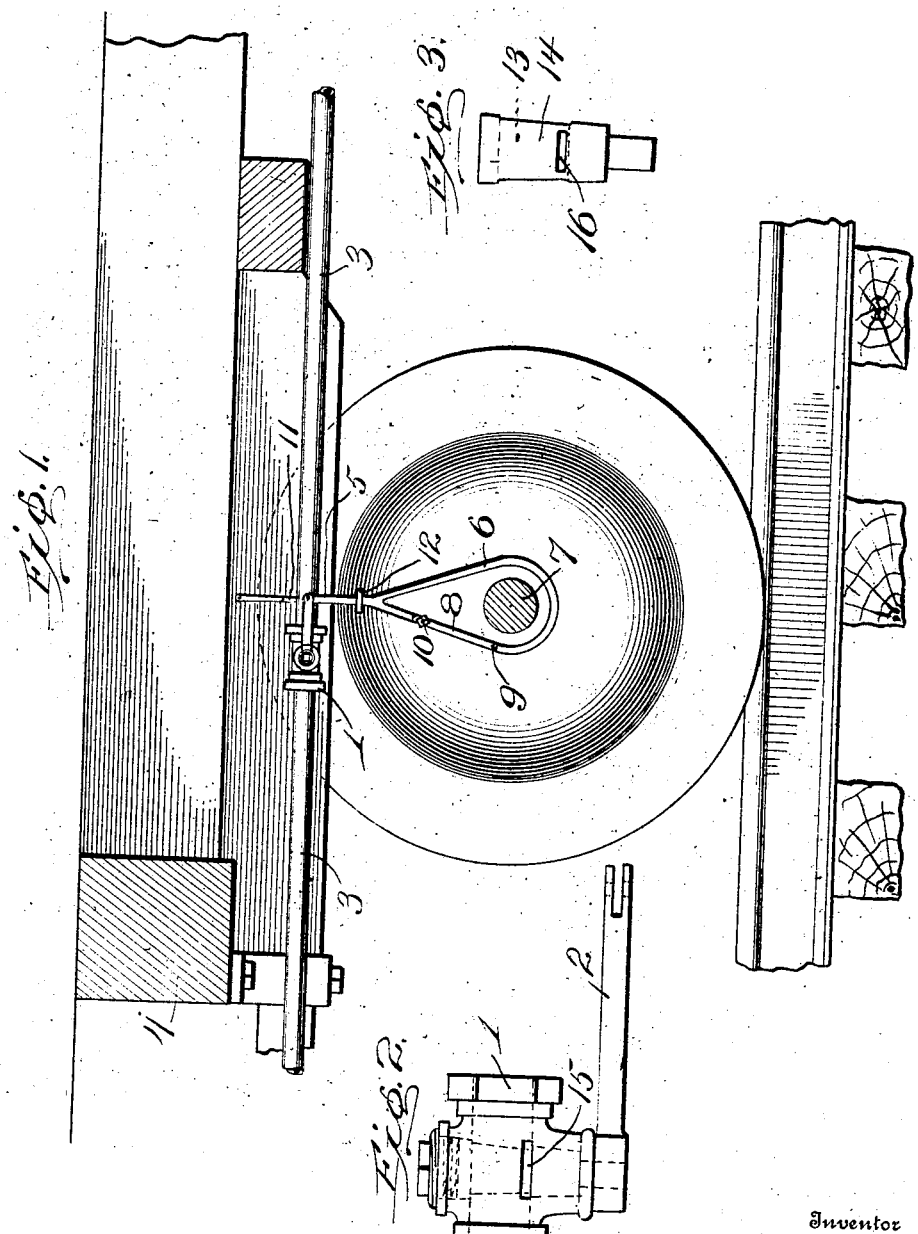

UNITED STATES PATENT OFFICE.

THOMAS J. CRAWFORD, OF TALLAPOOSA, GEORGIA.

AIR-BRAKE ATTACHMENT.

No. 908,648.  Specification of Letters Patent.  Patented Jan. 5, 1909.

Application filed July 17, 1908. Serial No. 444,113.

*To all whom it may concern:*

Be it known that I, THOMAS J. CRAWFORD, a citizen of the United States, residing at Tallapoosa, in the county of Haralson and State of Georgia, have invented certain new and useful Improvements in Air-Brake Attachments; and I do hereby declare the following to be a full, clear, and exact description of the invention, such as will enable others skilled in the art to which it appertains to make and use the same.

This invention relates to improvements in air brake attachments, and particularly to attachments that act to cause the instant application of the brakes upon the derailment of the trucks of a car, and has for an object the provision of means that normally will leave the air brake system of a train in condition for holding the brakes off the wheel, but when any of the trucks leave the track or any of the wheels of any of the trucks leave the track, will open the air pipes and permit the instant application of the brakes to the wheels.

Another object of the invention is the provision of an attachment for air brakes that will permit the usual up and down motion of the trucks as the same pass over the track, but will instantly open the brake system when either pair of wheels of any truck leave the track.

With these and other objects in view the invention comprises certain novel constructions, combinations and arrangement of parts as will be hereinafter more fully described and claimed.

In the accompanying drawings: Figure 1 is a fragmentary section of a car taken longitudinally thereof showing the present invention connected therewith. Fig. 2 is an enlarged detail view of a valve interposed in the brake system of the car and arranged with an operating lever. Fig. 3 is a detail view of the plug of the valve shown in Fig. 2.

In an ordinary air brake system the brakes are held off the wheel of the train as long as the system contains a sufficiently high pressure of air and the brakes are only applied when the pipes are opened and the air permitted to escape. Various valves have been provided and arranged to be easily operated whenever desired, and also means have been provided that are connected with the valves for opening the same when the trucks of any of the cars get out of proper alinement in relation to the car.

In the present invention the attachment is designed to not only open the brake system of the train when the truck moves out of proper alinement to the car to which it is attached but also to apply the brakes when any of the wheels of the truck leave the track or drop a specified distance below their normal position.

I have shown in the accompanying drawings one complete operative device in which 1 indicates a valve having an operating handle or lever 2. The valve 1 is interposed in pipes 3 of the brake system of a car 4. Pivotally connected with lever 2 is a bar 5 that is formed with an eye 6 at the lower end thereof which is adapted to encircle the axle 7 of one pair of wheels. The eye 6 is preferably made of sufficient size as to loosely fit around axle 7 and be spaced some little distance therefrom so as to permit the ordinary up and down movement or jarring of the axle as the wheels pass over the track. The eye 6 is preferably formed with a pivotally mounted member 8 that is preferably pivotally mounted at 9 and secured in position by a bolt 10. By this construction and arrangement bolt 10 may be removed and the eye 6 forced around axle 7 and then bar 5 again placed in position and secured in the position shown in Fig. 1 by means of bolt 10.

In order to prevent any swinging action of the eye 6 and bar 5 a guiding bracket 11 is secured to car 4 and has an eye 12 surrounding bar 5. Bracket 11 is held firmly against movement and consequently will prevent any swinging motion of bar 5 but will permit a free reciprocatory movement thereof.

Valve 1 is arranged so as to permit a free passage of air through pipe 3, the air passing through an opening 13 in the plug 14 of the valve. When the plug 14 is turned so as to permit opening 13 to register with aperture 15 air will escape from pipe 3 through opening 16 into plug 14 and from thence through opening 13 out through aperture 15. By this construction and arrangement air will be permitted to pass from one end of pipe 3 to the other freely when the valve is in one position, and to freely pass from both ends of pipe 3 out through opening 15.

In case of derailment the truck will drop a certain distance before the body of the car is affected. When the axle 7 thus drops by reason of the derailment of the truck the eye 6 is pulled downwardly together with bar 5. This movement of the bar 5 will act upon the lever 2 for opening valve 1 and permitting the air in the train pipe to escape and the brakes to set in the usual manner. As will be clearly evidenced the device may be applied simply upon one axle of each truck or upon only one truck, but as it is desirable to set the brake whichever truck may leave the track, it is, of course, obvious that in practice the device would be applied to each truck.

What I claim is:

1. In an air brake system for cars, a valve for opening the system, and a bar formed with means for encircling the axle of one of the pair of wheels of one of the trucks for actuating said valve, said rod being adapted to actuate said valve when said axle has moved away from said valve a predetermined distance.

2. In an air brake system for cars, a valve for opening said system, a pivotally mounted bar connected with said valve and adapted to actuate the same, said bar being formed with means for loosely encircling the axle of one of the trucks of said cars, and guide means loosely engaging said bar for preventing a swinging movement but permitting a reciprocatory movement thereof.

3. In an air brake system for cars, a valve interposed in said system, a reciprocating bar connected with said valve for actuating the same, means encircling one of the axles of one of the trucks of said car connected with said reciprocating bar, and a bracket secured to said car and formed with an eye through which said reciprocating bar is adapted to move, said bracket permitting a free reciprocation of said bar but preventing any swinging motion thereof.

In testimony whereof I affix my signature in presence of two witnesses.

THOMAS J. CRAWFORD.

Witnesses:
 A. V. HOWE,
 O. E. SUNNELSTEN.